(12) United States Patent
Zdarsky et al.

(10) Patent No.: US 9,439,104 B2
(45) Date of Patent: Sep. 6, 2016

(54) METHOD FOR SUPPORTING ADMISSION CONTROL AND/OR PATH SELECTION IN A COMMUNICATION NETWORK AND COMMUNICATION NETWORK

(75) Inventors: Frank Zdarsky, Karlsruhe/Durlach (DE); Xavier Pèrez Costa, Heidelberg (DE); Roberto De Marca, Rio de Janeiro (BR); Albert Banchs, Majadahonda (ES); Antonio De La Oliva, Madrid (ES)

(73) Assignees: NEC CORPORATION, Tokyo (JP); UNIVERSIDAD CARLOS III DE MADRID, Leganes (ES)

(*) Notice: Subject to any disclaimer, the term of this patent is extended or adjusted under 35 U.S.C. 154(b) by 763 days.

(21) Appl. No.: 13/384,450

(22) PCT Filed: Jul. 15, 2010

(86) PCT No.: PCT/EP2010/004318
§ 371 (c)(1),
(2), (4) Date: Mar. 22, 2012

(87) PCT Pub. No.: WO2011/006661
PCT Pub. Date: Jan. 20, 2011

(65) Prior Publication Data
US 2012/0170457 A1 Jul. 5, 2012

(30) Foreign Application Priority Data
Jul. 15, 2009 (EP) .................... 09009223

(51) Int. Cl.
*H04W 28/16* (2009.01)
*H04L 12/54* (2013.01)
(Continued)

(52) U.S. Cl.
CPC .......... *H04W 28/16* (2013.01); *H04L 12/5692* (2013.01); *H04L 45/00* (2013.01);
(Continued)

(58) Field of Classification Search
CPC ....... H04L 47/10; H04L 43/50; H04L 45/00; H04L 43/00; H04L 45/26; H04L 65/00; H04L 45/02; H04L 45/04; H04L 12/56; H04W 40/02; H04W 40/24; H04W 40/34; H04W 36/0005; H04W 28/16; H04W 52/0206; H04W 48/18; H04J 3/14

USPC ....... 370/232, 229, 238, 248, 252, 254, 310, 370/311, 331, 338, 351, 370, 230, 235, 370/237; 455/422.1, 436, 438, 445, 453
See application file for complete search history.

(56) References Cited

U.S. PATENT DOCUMENTS 7,457,298 B2 * 11/2008 Du et al. ...................... 370/401
7,564,783 B2 * 7/2009 Klein et al. .................. 370/230
(Continued)

FOREIGN PATENT DOCUMENTS

| JP | 2006020302 A | 1/2006 |
| WO | 2009/084051 A1 | 7/2009 |
| WO | WO 2009084051 A1 * | 7/2009 |

OTHER PUBLICATIONS

Japanese Office Action, dated Mar. 6, 2013, from corresponding JP application.
(Continued)

*Primary Examiner* — John Pezzlo
*Assistant Examiner* — Dharmesh Patel
(74) *Attorney, Agent, or Firm* — Young & Thompson

(57) ABSTRACT

A method for supporting admission control and/or path selection in a communication network, the network including a plurality of wireless communication links, possibly of different link technologies, established between a plurality of network nodes, includes the steps of partitioning the communication links of the network into groups of communication links—link groups—, assigning each link group an associated link group controller that is configured to observe and/or measure the performance and/or quality of the link group, based on the observations and/or measurements, computing estimates of metrics for the capacity of the respective link group and the costs for using each of the communication links of the respective link group, and transmitting the estimates to at least one resource management entity being configured to take admission control and/or path selection decisions on the basis of the estimates. A communication network with admission control and/or path selection supporting functionality is described.

14 Claims, 3 Drawing Sheets

Figure 1A:
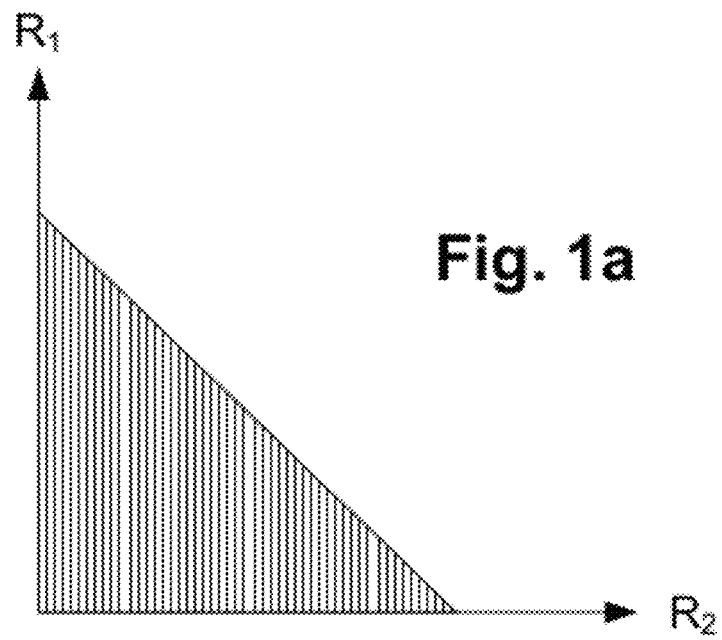

(51) Int. Cl.
*H04L 12/701* (2013.01)
*H04L 12/911* (2013.01)
*H04W 28/18* (2009.01)
*H04W 84/04* (2009.01)

(52) U.S. Cl.
CPC .......... *H04L 47/781* (2013.01); *H04L 47/822* (2013.01); *H04L 47/824* (2013.01); *H04L 47/828* (2013.01); *H04W 28/18* (2013.01); *H04W 84/042* (2013.01)

(56) References Cited

U.S. PATENT DOCUMENTS

| | | | |
|---|---|---|---|
| 7,616,575 B2 | 11/2009 | Padhye et al. | |
| 7,620,006 B2* | 11/2009 | Olariu et al. | 370/322 |
| 2003/0202476 A1* | 10/2003 | Billhartz | H04L 12/5695 370/236 |
| 2003/0204616 A1* | 10/2003 | Billhartz | H04L 12/5695 709/235 |
| 2004/0156353 A1* | 8/2004 | Bevan et al. | 370/351 |
| 2004/0203820 A1* | 10/2004 | Billhartz | H04W 40/02 455/452.1 |
| 2004/0219922 A1* | 11/2004 | Gage et al. | 455/445 |
| 2005/0190732 A1* | 9/2005 | Douglas et al. | 370/338 |
| 2008/0144497 A1* | 6/2008 | Ramprashad | H04L 41/0893 370/230.1 |
| 2009/0196343 A1* | 8/2009 | Cho et al. | 375/240.02 |

OTHER PUBLICATIONS

International Search Report, dated Jun. 7, 2011, from corresponding PCT application.

Antonio De La Oliva et al., "An Overview of IEEE 802.21: Media-Independent Handover Services", IEEE Wireless Communications, Aug. 1, 2008, pp. 96-103, vol. 15, No. 4; Cited in International Search Report.

Albert Banchs et al., "CARMEN: Delivering Carrier Grade Services over Wireless Mesh Networks", Personal, Indoor and Mobile Radio Communications, IEEE 19th International Symposium, Sep. 15, 2008, pp. 1-6; Cited in International Search Report.

Arturo Azcorra et al., "Supporting Carrier Grade Services Over Wireless Mesh Networks: the Approach of the European FP-7 Strep Carmen", Very Large Projects, IEEE Communications Magazine, Apr. 1, 2009, pp. 14-16, vol. 47, No. 4; Cited in International Search Report.

* cited by examiner

METHOD FOR SUPPORTING ADMISSION CONTROL AND/OR PATH SELECTION IN A COMMUNICATION NETWORK AND COMMUNICATION NETWORK

The present invention relates to a method for supporting admission control and/or path selection in a communication network, said network including a plurality of wireless communication links, possibly of different link technologies, established between a plurality of network nodes.

Furthermore, the present invention relates to a communication network with admission control and/or path selection supporting functionality, including a plurality of wireless communication links, possibly of different link technologies, established between a plurality of network nodes.

Providing quality of service to communication over wireless links or a whole network requires a careful control over the available communication resources. Two important processes in this respect are admission control, i.e. deciding whether to admit a new communication over a wireless link, and path selection (or routing), i.e. choosing a sequence of wireless links for the newly admitted or for ongoing communication through a network that fulfills the required quality of service constraints of the communication while optimizing a given objective, such as maximizing the amount of communications supported by the link or network.

These processes require information on the remaining capacity of each involved link as well as on the share of the remaining capacity that would be used by the communication to be admitted or routed (the "cost" of that communication). The remaining capacity can typically be computed by knowing the original capacity and subtracting the cost of all communication previously admitted to (or routed over) each involved link or routed over each involved link, respectively.

In wired networks, link capacity is either constant or changing in a controlled manner, and it is typically not shared between multiple links, i.e. links in wired networks are "point-to-point". This means that the entity performing the admission control test or the path selection, which is typically a Resource Management Entity (RME), needs only very infrequent updates on the status of links and can base its decisions mainly on its knowledge about previously admitted/routed communication. This has advantages whether the RME is implemented in a centralized or distributed fashion.

However, wireless links are different, because they use a broadcast medium, which means that one transmission can potentially be received by multiple receivers concurrently. Thus, links are typically "point-to-multipoint". Multiple transmitters can also potentially transmit on overlapping frequency bands, causing mutual interference which influences the available effective capacity. Finally, the capacity of a wireless link also depends on the currently used modulation and coding with which data is transmitted. The modulation and coding change over time, as the transmitter adapts to changing channel conditions, making the link capacity highly volatile as a result.

The sharing of resources between wireless links, the interference between links and the adaptation of modulation and coding make it more difficult to provide the RME with the current information required for its task. The information on a current link state can only be measured or observed at the link itself, e.g. by a Link Group Controller (LGC), and needs to be known by the RME, which can be centralized anywhere inside or outside the network or even distributed. In principle, there are three approaches on how to exchange the information:

1. Information on the link state is pushed from the LGC(s) to the RME(s) whenever a link state changes. However, this potentially incurs high signaling cost.
2. Information on the link state is pulled by the RME(s) from the respective LGC(s) whenever an admission control or path selection process needs to be performed. Signaling cost is again high, but lower than in the previous approach, because only LGCs whose links are affected by the admission control or path selection need to be queried. However, querying LGCs takes time, which delays the RME's tasks.
3. The RME(s) keep(s) track of available resources, based on a model of the capacity of links and the cost of previous and new communications, whose parameters are only infrequently updated.

While the latter approach has advantages over the first two, the problem is that different radio technologies employ very different medium access mechanisms with different notions of what constitutes the wireless link capacity and how it is shared, e.g. the deterministic OFDMA (Orthogonal Frequency-Division Multiple Access) in WiMAX (Worldwide Interoperability for Microwave Access) vs. the randomized CSMA/CA (Carrier Sense Multiple Access with Collision Avoidance) in WiFi. State of the art admission control and path selection uses any of the aforementioned approaches, but does so specialized on a given radio technology. Existing solutions thus do not provide a generic solution that can be reused for any radio technology and they are also not appropriate for heterogeneous scenarios with multiple radio technologies in one network.

It is therefore an object of the present invention to improve and further develop a method for supporting admission control and/or path selection in a communication network of the initially described type in such a way that, by employing mechanisms that are relatively simple to implement, the sharing of resources, interference and rate adaptation of wireless point-to-point and point-to-multipoint links is considered in an efficient way.

In accordance with the invention, the aforementioned object is accomplished by a method comprising the features of claim 1. According to this claim such a method is characterized in the steps of
partitioning said communication links of said network into groups of communication links—link groups—,
assigning each link group an associated link group controller that is configured to observe and/or measure the performance and/or quality of said link group,
based on said observations and/or measurements, computing estimates of metrics for the capacity of the respective link group and the costs for using each of the communication links of the respective link group, and
transmitting said estimates to at least one resource management entity being configured to take admission control and/or path selection decisions on the basis of said estimates.

Furthermore, the aforementioned object is accomplished by a communication network comprising the features of independent claim 16. According to this claim, such a network is characterized in that said communication links of said network are partitioned into groups of communication links—link groups—,
wherein each link group is assigned an associated link group controller that is configured to observe and/or measure the performance and/or quality of said link group, and that is further configured to compute, based on said observations and/or measurements, estimates of metrics for the capacity of the respective link group and the costs for using each of the communication links of the respective link group, and wherein said communication network further includes at least one resource management entity being configured to take admission control and/or path selection decisions on the basis of said estimates.

According to the invention it has first been recognized that a model-based approach for supporting admission control and path selection decisions can be efficiently implemented in a network of communication links that is partitioned into groups of links with the characteristics that each link belongs to exactly one such group and that interference between links of different link groups is negligible for the purpose of resource management, e.g. as a result of spatial or frequency multiplexing. Each group of links has an associated link group controller (LGC) that observes and/or measures possibly technology-specific performance metrics of said group of communication links.

The LGCs, based on said observations or measurements, compute estimates of metrics for the capacity of their respective link group as well as the "cost" for using each link in said link group. Further, one or more resource management entities (RMEs) exist that exchange signaling messages with the LGCs and perform said admission control and/or path selection processes. By adapting the computation process for the estimates, the estimated metrics can be provided in a technology-independent form (covering radio technologies as diverse as OFDMA and CSMA/CA) and even media-independent form (including wired media as well), or, in other words, technology-specific performance metrics can be mapped to technology-independent performance metrics. As a result, according to the present invention a generic admission control and/or path selection mechanism is provided that can be applied with any wired or wireless technology and even heterogeneous scenarios with two or even more different link technologies. Due to the model-based character of the present invention a low overall signaling overhead is ensured.

According to a preferred embodiment the link groups are configured in such a way that communication links in each link group share the capacity of at least one common communication resource. By this it is possible to regard a link group as a convex covering in which the shared communication resource, i.e. bandwidth, can be subdivided and assigned to the link group's communication links.

At the same time it may be provided that link groups are configured in such a way that the dependency of communication links from different link groups is below a predefined threshold. This means that links from different link groups are sufficiently independent from each other, i.e. the interference between them is negligible and using a link from one group does not significantly affect the capacity of another group. This implementation is advantageous since with respect to admission control and path selection decisions can be made for each link group individually without being dependent on or affecting another link group. For example, in an FDD (Frequency Division Duplexing) or TDD (Time Division Duplexing) system, the uplinks and downlinks between a base station and its subscriber stations would typically be assigned to different link groups. In contrast, if uplink and downlink resources can be dynamically allocated between uplink and downlink (e.g. in a pure TDMA (Time Division Multiple Access) or polling-based system), said up- and downlinks would be assigned to the same link group.

With respect to keeping the model and the required computations as low as possible, it may be provided that each of the communication links is modeled as unidirectional point-to-point communication link. This means that bi-directional links are modeled as two unidirectional links and 1:n point-to-multipoint links are modeled as n point-to-point links instead.

According to a preferred embodiment the model is implemented in such a way that the link group controllers assign their associated link group an effective capacity, in the following denoted as $C_G$. The effective capacity $C_G$ reflects the link group's "net" capacity discounting for the respective protocol-related overheads (like e.g. frame headers, interframe and guard spaces, etc.). Advantageously, it is not measured in terms of "bits per second" or "symbols per second", as is the typical measure of capacity in traditional access control and path selection, but in scheduling units per second [$SU*s^{-1}$]. A scheduling unit is defined as the smallest data transmission unit that a given technology allows to be scheduled. For example, in a WiMAX OFDMA system, it would correspond to a "burst" of symbols, in a time-slotted system to a time slot, in an 802.11 PCF (Point Coordination Function)-based system to a TXOP (Transmission Opportunity), etc. By exchanging capacity-related information in this measurement unit, link group controllers and resource management entities implicitly also inform each other about the granularity of (potential) resource allocations. Otherwise, this information would need to be exchanged upon registration of the link group controller at the resource management entity, explicitly included in the signaling messages or ignored for admission control and path computation purposes, in which case the likelihood of resource allocation failure is increased.

In particular in case of uncoordinated medium access it is important to take into consideration that the capacity region that can be allocated to transmitters is not linear, due to the effect of contention at medium access between transmitters. In order to reduce computational complexity it proves to be advantageous to calculate the effective capacity of a link group by applying linearization and maximization techniques. In this context the linearization could be performed in such a way that also a proportional fairness between all transmitters involved is realized. Alternatively, it would also be feasible to describe or approximate the original, non-linear boundary of the capacity region by some other function, like a step function or a sequence of piece-wise linear functions.

According to a still further preferred embodiment the model is implemented in such a way that the link group controllers assign each link of their associated link group a link cost that reflects the capacity consumption required to transmit over the respective link. Following the unit chosen for the effective capacity, the link cost c(L) assigned to a link L of a link group (L∈G) may be measured in scheduling units per bit [$SU*b^{-1}$]. The interpretation of this cost would then be the number of scheduling units that needs to be spent to transmit one bit of information over a given link.

The link cost might comprise any information (e.g. overheads or other inputs) or combination thereof considered relevant for an admission control decision. In particular, the link cost may take into consideration the related signal transmission efficiency of the respective link, e.g. the efficiency of the chosen modulation and coding scheme and the expected overhead for retransmissions as a result of the current radio link quality. Alternatively or additionally, the link cost may take into consideration the related operation cost of the operator (e.g., some links might be leased and paid according to usage) and/or the power consumption (e.g., transmission through some links might result in a larger power consumption of the network than others) and/or the interference budget for transmitting over the respective link (e.g., transmission through some links might result in reducing the available capacity of neighboring links).

Advantageously, the estimates of metrics for the capacity of a link group and the costs for using each of the communication links of the respective link group are computed in a conservative fashion (i.e. rather under-estimating than over-estimating capacity and vice versa for the cost) as longer-term expected values. This enables the resource management entities (RMEs) to perform their decisions based on these metrics, i.e. the metrics are sufficiently accurate and stable that a later allocation of resources is unlikely to fail).

With respect to high flexibility and comprehensive application opportunities it may be provided that the estimates of metrics for the capacity of a link group and the costs for using each of the communication links of the respective link group are computed separately for different quality of service classes. For communication of a service class requiring, e.g., a lower forwarding latency or a lower loss probability, the additional overhead, e.g. for scheduling or for more robust modulation and coding, would then be allocated to the link cost for that service class.

In a preferred embodiment the capacity of a link group and the costs for using each of the communication links of the respective link group are related to a specific communication resource, in particular bandwidth resources. Alternatively, the parameters may be related to energy resources. For example, to consider energy resources, the energy capacity of a battery-powered node or the energy consumption of a radio interface could be considered into the link group capacity, the required transmit energy for a given receiver at a given link quality and service class into the link cost parameter.

With respect to a reliable notification of the RME(s) it may be provided that the estimates of metrics for the capacity of a link group and the costs for using each of the communication links of the respective link group are transmitted periodically from the link group controllers to the RMEs. Alternatively, in order to reduce signaling overhead the notification may be performed on demand only (i.e. in a publish/subscribe manner). For example, the link group controllers could provide updates of the link cost estimates whenever their previous estimation is no longer accurate due to changes of the respective link's quality.

According to a preferred embodiment it may be provided that the RME(s), on the basis of the information received from the link group controllers, perform in advance tests of admission control and/or path selection decisions. In other words, the RMEs can use the provided information to test in advance and remotely, how an admission control or path selection decision would influence the remaining capacity in the network.

Figure 1B:
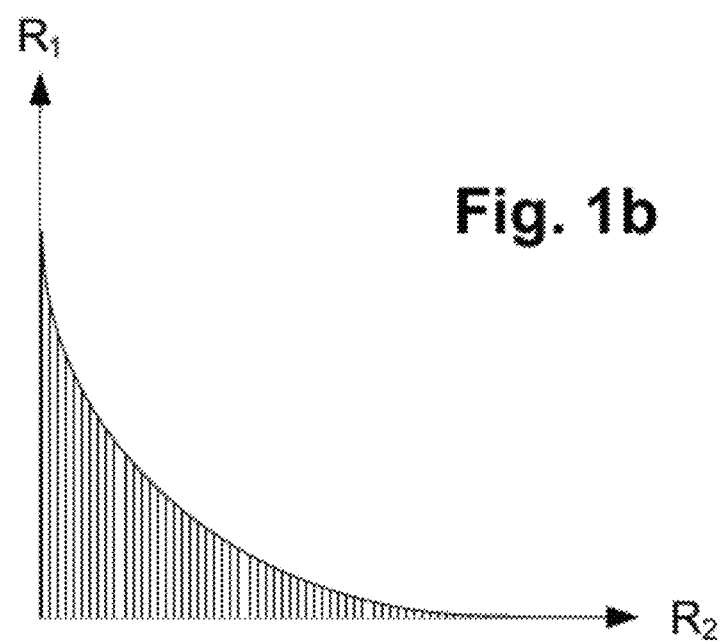
Figure 2:
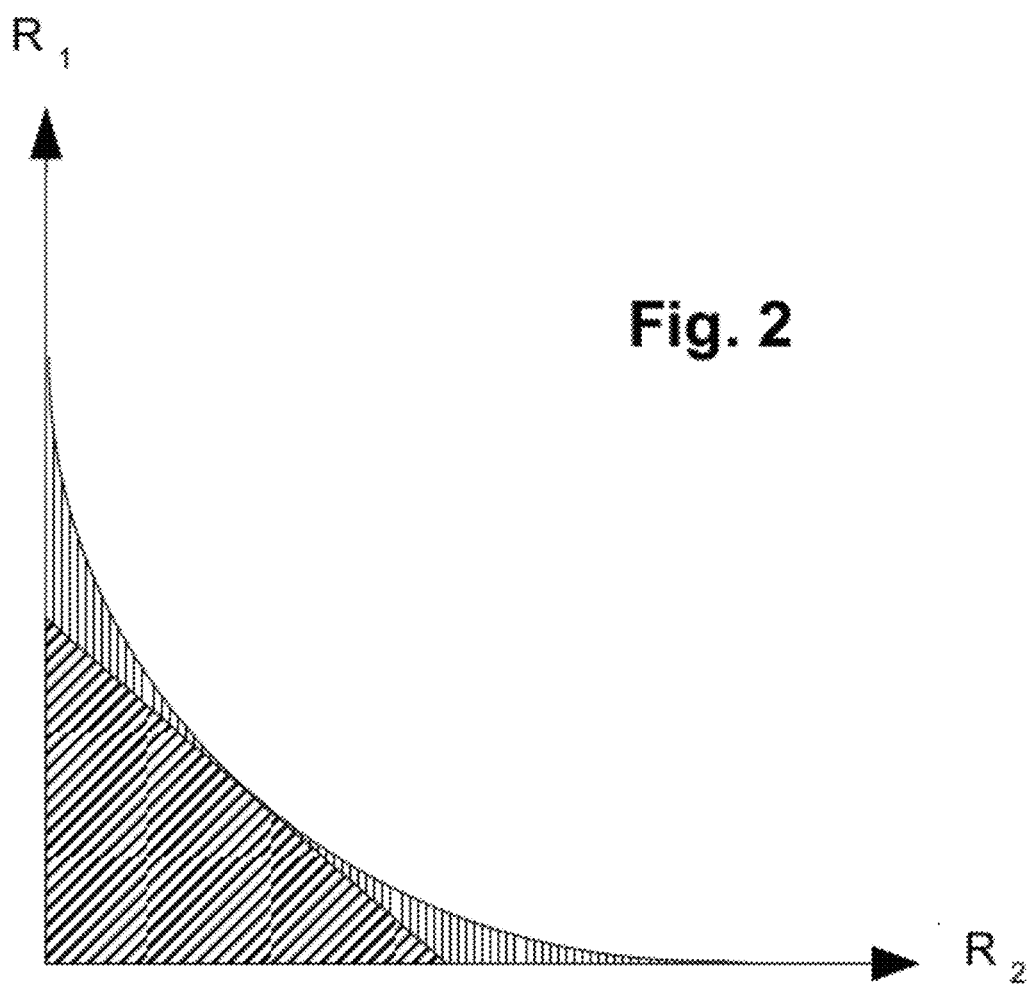
Figure 3:
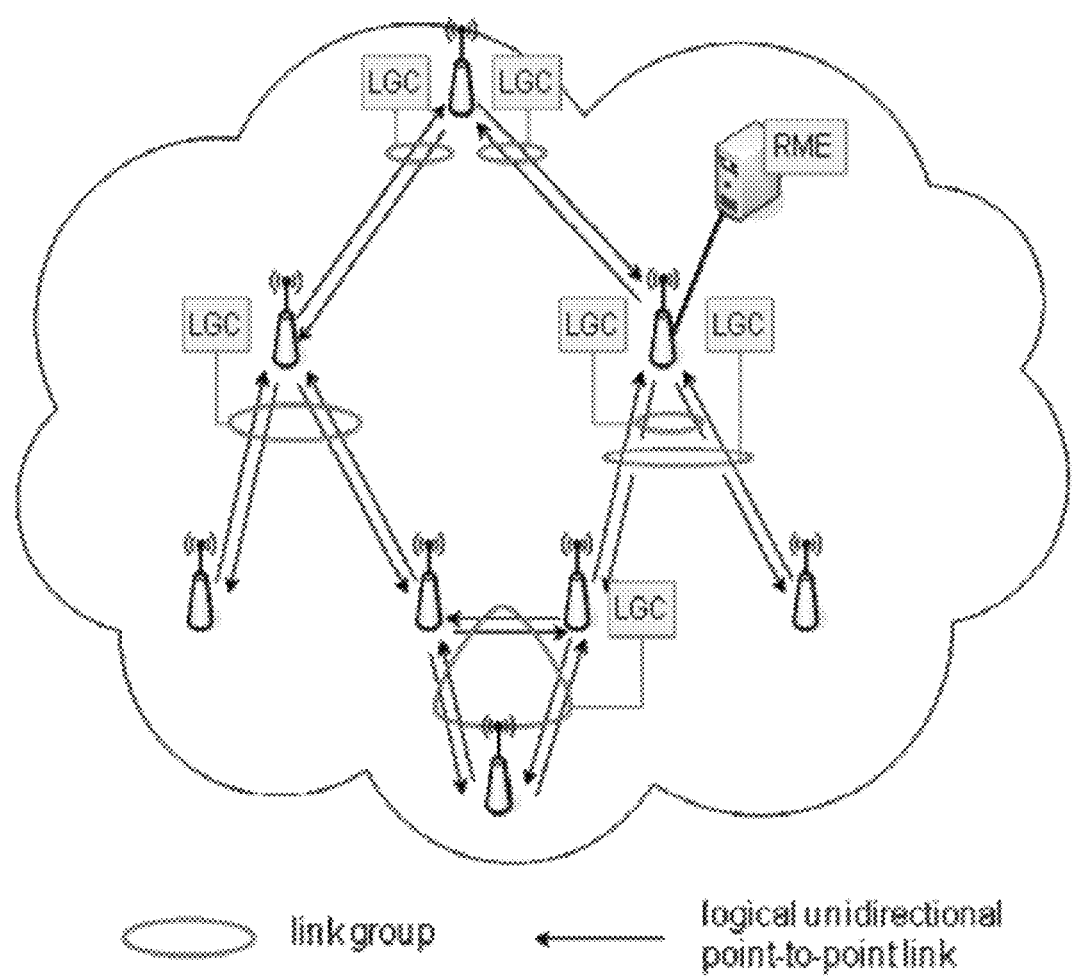

There are several ways how to design and further develop the teaching of the present invention in an advantageous way. To this end, it is to be referred to the patent claims subordinate to patent claims 1 and 16 on the one hand, and to the following explanation of a preferred example of an embodiment of the invention illustrated by the drawing on the other hand. In connection with the explanation of the preferred example of an embodiment of the invention by the aid of the drawing, generally preferred embodiments and further developments of the teaching will be explained. In the drawings FIG. 1a is a diagram schematically illustrating a capacity region in a coordinated medium access scenario, FIG. 1b is a diagram schematically illustrating a capacity region in an uncoordinated medium access scenario, FIG. 2 is a diagram schematically illustrating the linearization of the capacity region for uncoordinated medium access of FIG. 1b, and FIG. 3 is a schematic view illustrating a wireless communication network with a plurality of physical links according to an embodiment of the present invention.

The effective capacity of a link group for radio technologies that use a coordinated medium access scheme can be determined by considering the available resources that can be allocated for QoS services as well as the different factors that might change the amount of resources. For instance, in the case of OFDMA systems as WiMAX, the amount of available resources can be computed based on the number of slots available which could be directly mapped to Scheduling Units in the proposed model. However, the effective total number of available slots may be subject to different variations. In the context of the present invention these variations are constantly or periodically measured or observed by link group controllers that are associated to the respective link group. The results are reported to at least one resource management entity that is responsible for taking admission control and/or path selection decisions on the basis of the results.

The above mentioned variations may depend on various parameters of which the most important ones are discussed in the following listing:

Packing algorithm: In the downlink direction (i.e. transmission from a base station BS to a mobile station MS) different packing methods might result in a different number of slots non-usable for data transmission which will change on a frame basis depending on the sizes of the bursts to be packed.

Padding: Frames to be transmitted in the downlink direction need to be fitted in a rectangular shape. Depending on the number of bits to be transmitted and the current modulation and coding scheme to be used the amount of non-usable slots due to padding will be different and will also change on a frame basis.

Modulation and coding scheme (MCS): The MCSs used for transmission between a BS and its associated MSs might change on a per frame basis.

Interference: Changes in the amount of interference received might result in changes in the MCS used by the BS and/or MSs.

Signaling overhead: Due to specifics in the WiMAX standard for signaling purposes a linear increase in the number of bursts to be signaled might not result in a linear increase in the number of non-usable slots.

FIG. 1a relates to a coordinated medium access scheme and illustrates exemplarily the capacity region in a scenario with only two transmitters (with rates $R_1$ and $R_2$). In the illustrated embodiment the effective capacity corresponds to the y-intercept, and the slope of the curve is determined by the ratio of the link cost. The hatched region below the curve corresponds to feasible rate allocations between the two transmitters, wherein the curve itself represents the maximum of feasibility.

Turning now to the case of uncoordinated medium access schemes, as for instance WiFi's (E)DCF-based (Enhanced Distributed Coordination Function) medium access, the effective capacity depends, among other things, on the numbers of transmitters and the rates at which transmitters try to send data. FIG. 1b illustrates the capacity region for WiFi's (E)DCF-based medium access scheme.

As can be obtained from FIG. 1b the curve delimiting the capacity region is not linear, due to the effect of contention at medium access between transmitters.

In a preferred implementation, the effective capacity for uncoordinated medium access schemes like (E)DCF can be determined as follows:

As a first step, the capacity region for the given link group is maximized by setting the transmitters' CSMA/CA parameters such that:
$CW_{min,i}=CW_{max,i}=CW_i$ for each transmitter i,
AIFS=DIFS, and
TXOP=constant,
wherein the abbreviations have the following common meaning:
CW=Contention Window,
AIFS=Arbitration Interframe Space,
DIFS=Distributed Coordination Function Interframe Space, and
TXOP=Transmission Opportunity.

In a next step, the optimal configuration of $CW_i$s can be found by performing the following computations:

First, the probability $\tau_i$ that a transmitter i transmits in a backoff slot time is determined:

$$\tau_i = \frac{2}{CW_i + 1}$$

The relationship between the $\tau$s is:

$$\frac{\tau_i}{\tau_j} \approx \frac{R_i}{R_j} \rightarrow \tau_i = w_i \tau_1$$

wherein the $R_i$s denote the transmission rates of transmitters i. The rates can be expressed as an approximate function of one tau as follows:

$$r_i \approx \sum_i \frac{l(a\tau_1 + b\tau_1^2)}{c + d\tau_1 + e\tau_1^2}$$

To maximize rates, the derivative is taken and the tau is isolated:

$$\frac{\partial r_i}{\partial \tau_1} = 0 \rightarrow A\tau_1^2 + B\tau_1 + C = 0$$

$$\tau_1 = \frac{-B + \sqrt{B^2 - 4AC}}{2A}$$

The corresponding $CW_i$s can be computed from this.

Next, the capacity region is linearized by finding a tangent on the original, non-linear curve for the capacity region. Multiple tangent points can be determined; however, the preferred implementation is to choose a tangent point that ensures proportional fairness between the transmitters concerned. An exemplary result of such linearization process is illustrated in FIG. 2.

Apart from linearizing the capacity region as described above, it would also be feasible to describe or approximate the original, non-linear boundary of the capacity region by some other function, like a step function or a sequence of piece-wise linear functions. This alternative description would require a model with more parameter values to describe the link group capacity and link costs, though.

According to an embodiment of the present invention, FIG. 3 schematically illustrates an example of a wireless network with physical links represented by logical unidirectional point-to-point links grouped into link groups, each of which is controlled by an LGC that reports link group parameters to a centralized RME. In a network as illustrated in FIG. 3, according to a preferred implementation, media-independent admission control and/or path selection is performed as described in the following:

During runtime of the system, an LGC periodically measures (i.e. actively) and/or observes (i.e. passively) the performance and quality of the links in its associated link group. The LGC function is typically, but not necessarily, located on the device responsible for scheduling access to the medium, e.g. the base station in a WiMAX system or the access point in a PCF- or HCCA (HCF (Hybrid Coordination Function) Controlled Channel Access)-based WiFi system. With distributed medium access schemes, like DCF-based WiFi, the LGC could also be distributed, though.

An LGC then computes the metrics for both the capacity of its link group as well as the cost for each link in that group. The values for these metrics are determined such that they provide a sufficiently accurate estimation over an extended period of time. That is, they do not describe the instantaneous values, but can be seen as longer-term expected values that an LGC tries to assure to the RME. The estimations can be based on, e.g., exponentially or sliding window averages, regression models, historical data or similar. The estimations would typically also be on the conservative side, i.e. rather under-estimating than over-estimating capacity (and vice versa for the cost).

An LGC then provides information about the link group(s) they control, the links contained in these link groups, the link group's capacity and the link costs to its associated RME(s), by sending signaling messages or via method calls (also known as function calls, i.e. calls with an integrated program interface), depending on the location of the RMEs. This information may further include a flag that indicates whether the underlying link technology supports native multicast, i.e. it can transmit to several receivers in one transmission, or has to emulate multicast, i.e. to send one unicast transmission to each receiver in a multicast group.

LGCs can provide this information to RMEs periodically or only on demand to reduce signaling overhead. For example, the LGCs could provide updates of the link cost estimates whenever their previous estimation is no longer accurate due to changes of the respective link's quality. Other information would only need to be provided once, e.g. whether a link group supports native multicast.

RMEs can then use the provided information to test in advance and remotely, how an admission control or path selection decision would influence the remaining capacity in the network.

For example, it is assumed that F is a set of communication flows already admitted to the network by admission control and that $G_f$ is the subset of links of a link group G ($G_f \subseteq G$) that a flow f∈F needs to use to reach each of the intended receivers of a given transmission. $G_f$ thus models a multicast transmission directed to those receivers. It is important to note that in this model a unicast transmission can be considered as a special case of multicast transmission where the cardinality of $G_f$ is 1. Finally, it is assumed that $r_f$ is the traffic demand of flow f, measured in bits per second [b/s].

The effective cost $c_{\textit{eff}}(f)$ of a flow to a particular set of receivers, assuming a particular admission control allocation, can then be computed and it depends on whether the underlying physical technology supports native multicast or whether multicast has to be emulated by separate unicast transmissions to each receiver:

$$c_{\textit{eff}}(f) = \begin{cases} max_{L \in G_f} c(L) & \text{(for native multicast)} \\ \sum_{L \in G_f} c(L) & \text{(for emulated multicast)} \end{cases}$$

A link group G's remaining capacity $C^*(G)$ can be then computed as:

$$C^*(G) = C(G) - \sum_{f \in F} c_{\textit{eff}}(f) \cdot r_f$$

and the residual rate $r^*(L)$ for a link L as:

$$r^*(L) = \frac{C^*(G)}{c(L)}$$

Finally, the RMEs can signal back to an LGC, which share of resources shall be allocated to a given communication or class of communications that has been admitted to the network and routed over a link of a link group controlled by the respective LGC.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for supporting network admission control or capacity-constrained path selection in a communication network,
   wherein said network includes a plurality of wireless communication links established between a plurality of network nodes,
   wherein said method can accommodate the plurality of wireless communication links being of different link technologies, and wherein said method comprises:
   partitioning in said network said communication links of said network into groups of communication link groups,
   assigning in said network each of said link groups an associated link group controller that is configured to perform at least one of observing and measuring the performance or quality of its associated link group, based on said observations or measurements, computing by each link group controller estimates of metrics for a capacity of the associated link group in terms of the capacity of the associated link group and link costs for using each of the communication links of the associated link group, and
   transmitting in said network said estimates to at least one resource management entity that is configured to take network admission control or capacity-constrained path selection decisions on a basis of said estimates,
   wherein said link groups are configured in such a way that communication links in each link group share a capacity of at least one common communication resource, and
   wherein said link groups are configured in such a way that dependency of communication links from different link groups is below a predefined threshold.

2. The method according to claim 1, wherein, for determining the capacity of said link groups or the cost of using said links, each of said communication links is modeled as multiple unidirectional point-to-point communication links while allowing communication in a bidirectional or point-to-multipoint manner.

3. The method according to claim 1, wherein each of said link group controllers assigns its associated link group an effective capacity that reflects the associated link group's net capacity discounting for the respective protocol-related overheads.

4. The method according to claim 3, wherein said effective capacity of said associated link group, in particular in case of uncoordinated medium access, is calculated by applying maximization and linearization techniques.

5. The method according to claim 1, wherein each of said link group controllers assigns each link of its associated link group a link cost that reflects the capacity consumption required to transmit over the respective link.

6. The method according to claim 1, further comprising, calculating said link costs, taking into consideration related signal transmission efficiency of each of the communication links of the associated link group.

7. The method according to claim 1, further comprising, calculating said link costs, taking into consideration at least one of power consumption and interference for transmitting over each of the communication links of the associated link group.

8. The method according to claim 1, further comprising, calculating said link costs, taking into consideration a related monetary operational cost for transmitting over each of the communication links of the associated link group.

9. The method according to claim 1, wherein said estimates of metrics for the capacity of said associated link group and the costs for using each of the communication links of the associated link group are computed in a conservative fashion as longer-term expected values.

10. The method according to claim 1, wherein said estimates of metrics for the capacity of said associated link group and the costs for using each of the communication links of the associated link group are computed separately for different service classes.

11. The method according to claim 1, wherein said capacity of said associated link group and the costs for using each of the communication links of the associated link group are related to a specific communication resource, in particular bandwidth resources or energy resources.

12. The method according to claim 1, wherein said estimates of metrics for the capacity of said associated link group and the costs for using each of the communication links of the associated link group are transmitted from said link group controllers to said at least one resource management entity on demand only.

13. The method according to claim 1, wherein said at least one resource management entity, on the basis of the information received from said link group controllers, performs in advance tests of admission control or capacity-constrained path selection decisions.

14. A communication network with network admission control or capacity-constrained path selection supporting functionality, comprising:
  a plurality of wireless communication links, that can accommodate a plurality of different link technologies, established between a plurality of network nodes,
  wherein said communication links of said network are partitioned into link groups,
  wherein each of said link groups is assigned an associated link group controller that is configured to:
  perform at least one of observing and measuring the performance or quality of its associated link group, and
  compute, based on said observations or measurements, estimates of metrics for a capacity of its associated link group in terms of a capacity of the associated link group and costs for using each of the communication links of the associated link group,
  wherein said communication network further includes at least one resource management entity that is configured to take network admission control or capacity-constrained path selection decisions on a basis of said estimates,
  wherein said link groups are configured in such a way that communication links in each link group share the capacity of at least one common communication resource, and
  wherein said link groups are configured in such a way that a dependency of communication links from different link groups is below a predefined threshold.

* * * * *